(12) United States Patent
Niwa

(10) Patent No.: US 11,849,229 B2
(45) Date of Patent: Dec. 19, 2023

(54) IMAGE CAPTURING APPARATUS HAVING PHOTON DETECTION AND CONTROL METHOD THEREFOR

(71) Applicant: CANON KABUSHIKI KAISHA, Tokyo (JP)

(72) Inventor: Masashi Niwa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/819,594

(22) Filed: Aug. 12, 2022

(65) Prior Publication Data
US 2023/0057944 A1  Feb. 23, 2023

(30) Foreign Application Priority Data

Aug. 20, 2021 (JP) .................. 2021-135027

(51) Int. Cl.
H04N 25/713 (2023.01)
H04N 25/53 (2023.01)
(52) U.S. Cl.
CPC .......... H04N 25/713 (2023.01); H04N 25/53 (2023.01)
(58) Field of Classification Search
CPC ..... H04N 25/713; H04N 25/53; H04N 25/773
USPC .................................. 348/207.99
See application file for complete search history.

(56) References Cited

U.S. PATENT DOCUMENTS

| 9,210,350 B2 | 12/2015 | Dai |
| 2019/0182442 A1* | 6/2019 | Ikedo ................ H04N 25/42 |
| 2020/0036918 A1* | 1/2020 | Ingle ................ H01L 27/14625 |
| 2020/0053266 A1* | 2/2020 | Ogushi ............... G03B 19/023 |

FOREIGN PATENT DOCUMENTS

WO     2019/065174 A1    4/2019

OTHER PUBLICATIONS

Zhang, C., "CMOS SPAD Sensors for 3D Time-of-Flight Imaging, LiDAR and Ultra-High Speed Cameras", doctoral thesis, Delft University of Technology, 2019; pp. 1-168.

* cited by examiner

Primary Examiner — Lin Ye
Assistant Examiner — Chan T Nguyen
(74) Attorney, Agent, or Firm — CANON U.S.A., INC. IP Division

(57) ABSTRACT

An image capturing apparatus includes M detection elements, a readout circuit, and a control pulse providing circuit. Each of the M detection elements includes a detection pixel configured to detect incidence of a photon and a generation circuit configured to generate a readout request and data based on the detection of the photon in the detection pixel. The readout circuit is configured to receive the readout request and the data from each of the M detection elements. The control pulse providing circuit is configured to provide a control pulse to the M detection elements and the readout circuit. The readout circuit determines the generation circuit corresponding to the readout request and a generation timing at which the readout request is generated, based on a counter value of the time counter and the number of delay cycles included in the data corresponding to the received readout request.

13 Claims, 8 Drawing Sheets

IMAGE CAPTURING APPARATUS HAVING PHOTON DETECTION AND CONTROL METHOD THEREFOR

BACKGROUND

Technical Field

One disclosed aspect of the embodiments relates to an image capturing apparatus.

Description of the Related Art

There is known a photoelectric conversion apparatus that digitally counts the number of incoming photons to an avalanche photodiode (APD) and outputs, from a pixel, a digital signal obtained by photoelectrically converting the count value. In terms of noise and signal calculation processing, digitization of a pixel signal has a great advantage, and an image capturing apparatus in which a plurality of pixels for outputting photoelectrically converted digital signals are arrayed has become popular. U.S. Pat. No. 9,210,350 (patent literature 1) discloses a method in which if the counted number of photons reaches a threshold within a time shorter than one frame, the image capturing apparatus measures the time, and obtains the number of photons per frame from the time information and the number of photons.

The APD is often used as a distance measurement device using the ToF (Time of Flight) method. In the ToF method, light is emitted and light reflected by a measurement target object is detected, thereby converting the detected light into a distance to the measurement target object based on the time difference between the emission and the detection. To derive the time difference, for example, a TDC (Time to Digital Converter) as a time counter is used. In the ToF method using the APD, a photon detected due to reflected light cannot be discriminated from a photon detected due to disturbance light by one measurement operation. International Publication No. 2019/065174 (patent literature 2) discloses a method of calculating a distance from the peak value of a histogram generated by repeatedly emitting and detecting light several thousand times and storing the results.

As described above, in either the image capturing apparatus represented by patent literature 1 or the distance measurement apparatus represented by patent literature 2, it is necessary to improve the resolution of the time counter to perform accurate processing. However, since the time counter having a high time resolution increases in circuit scale, it is difficult to include the time counter for each pixel. Patent literature 2 discloses a technique of suppressing an increase in circuit scale by connecting one time counter to a plurality of pixels. In Zhang, C., "CMOS SPAD Sensors for 3D Time-of-Flight Imaging, LiDAR and Ultra-High Speed Cameras", doctoral thesis, Delft University of Technology, 2019 (non-patent literature 1), there is disclosed a technique of suppressing an increase in circuit scale by connecting, for each row formed by a plurality of pixels, time counters the number of which is smaller than that of pixels per row.

However, for the TOF application, in either of the arrangements disclosed in patent literature 2 and non-patent literature 1, it is impossible to detect that a plurality of pixels sharing a time counter simultaneously receive photons. In patent literature 2, the system has a mechanism of preventing photons from being received simultaneously by temporally exclusively setting the photon detection periods of pixels sharing a time counter. In non-patent literature 1, if two or more pixels sharing a time counter simultaneously receive photons, a collision between received light pulses is detected but the collided received light pulses are neglected. In a distance measurement sensor such as a ToF sensor, if many pixels of a high-resolution pixel array share a time counter, the probability that photons are simultaneously detected increases. Thus, if simultaneous detection of photons by two or more pixels is neglected, the measurement accuracy unwantedly decreases.

On the other hand, if the technique disclosed in patent literature 2 is applied to an image sensor, described in patent literature 1, that forms an image, the frame rate unwantedly decreases. If the technique disclosed in non-patent literature 1 is applied, pixels are missing.

SUMMARY

According to one aspect of the embodiments, an image capturing apparatus includes M (M is an integer not less than 2) detection elements, a readout circuit, and a control pulse providing circuit. Each of the M detection elements includes a detection pixel configured to detect incidence of a photon and a generation circuit configured to generate a readout request and data based on the detection of the photon in the detection pixel. The readout circuit is configured to receive the readout request and the data from each of the M detection elements. The control pulse providing circuit is configured to provide a control pulse to the M detection elements and the readout circuit. The generation circuit of each of the M detection elements includes a cycle counter, a coordinate holding circuit, and a data generation circuit. The cycle counter is configured to count the number of delay cycles from when the readout request is issued until the readout request is permitted. The coordinate holding circuit is configured to hold position coordinate information of the detection element corresponding to the generation circuit. The data generation circuit is configured to generate the data including the number of delay cycles and the position coordinate information. The readout circuit includes a time counter configured to count a time based on the control pulse. The readout circuit determines the generation circuit corresponding to the readout request and a generation timing at which the readout request is generated, based on a counter value of the time counter and the number of delay cycles included in the data corresponding to the received readout request.

According to another aspect of the embodiments, an image capturing apparatus including an image sensor in which a plurality of detection pixels each configured to detect a photon are arranged, includes a time counter, a pixel circuit, and a readout circuit. The time counter is configured to count an elapsed time after a start of exposure of the image sensor. The pixel circuit is arranged for each of the plurality of detection pixels and including a pixel counter configured to count the number of photons detected by the detection pixel and a delay counter configured to count, if the pixel counter is saturated, an elapsed time after the pixel counter is saturated. The readout circuit is configured to determine, based on a count result of the delay counter and a count result of the time counter, a pixel value of the detection pixel in which the pixel counter is saturated, and determine, based on a count result of the pixel counter, a pixel value of the detection pixel in which the pixel counter is not saturated.

According to the disclosure, pixel readout processing is performed while suppressing an increase in circuit scale.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

DESCRIPTION OF THE EMBODIMENTS

Figure 1:
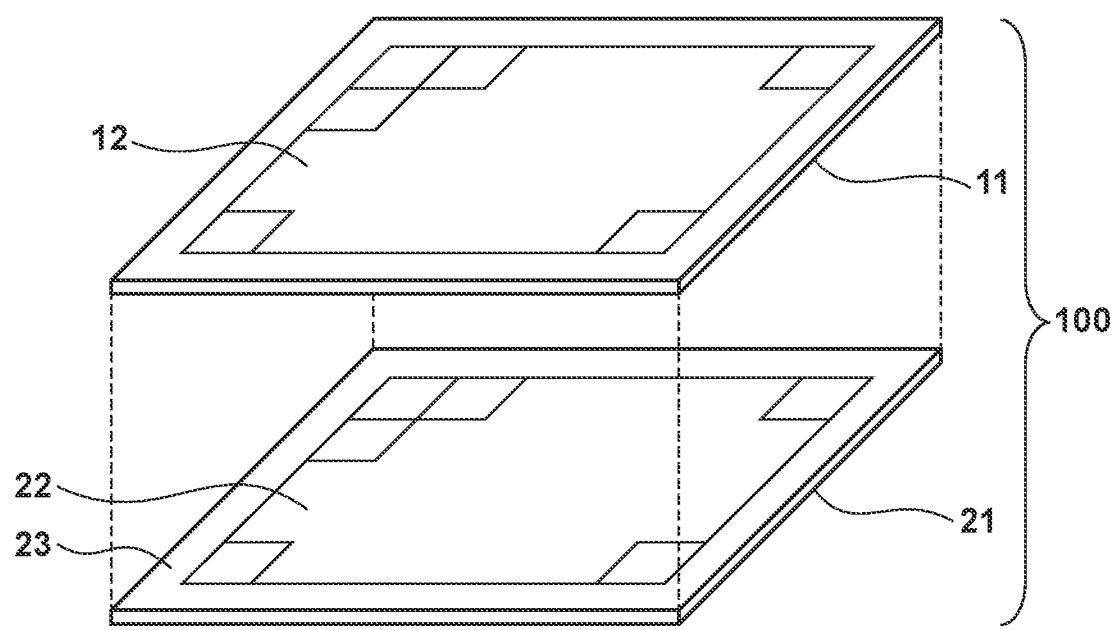
FIG. 1 is a view showing an example of the arrangement of an image capturing apparatus.

Hereinafter, embodiments will be described in detail with reference to the attached drawings. Note, the following embodiments are not intended to limit the scope of the claimed embodiment. Multiple features are described in the embodiments, but limitation is not made to a disclosure that requires all such features, and multiple such features may be combined as appropriate.

Furthermore, in the attached drawings, the same reference numerals are given to the same or similar configurations, and redundant description thereof is omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above.

First Embodiment

As the first embodiment of an image capturing apparatus according to the disclosure, an image capturing apparatus that uses an avalanche photodiode (APD) as a photoelectric conversion element will be exemplified below. Note that the image capturing apparatus is described here but a distance measurement apparatus can be adopted.

<Apparatus Arrangement>

FIG. 1 is a view showing an example of the arrangement of an image capturing apparatus 100 according to the first embodiment. The image capturing apparatus 100 is formed by stacking two chips of a sensor chip 11 and a circuit chip 21 and electrically connecting them. The sensor chip 11 includes a pixel region 12. The circuit chip 21 includes a pixel circuit region 22 for processing a signal detected in the pixel region 12, and a readout circuit region 23 for reading out a signal from the pixel circuit region 22.

Figure 2:
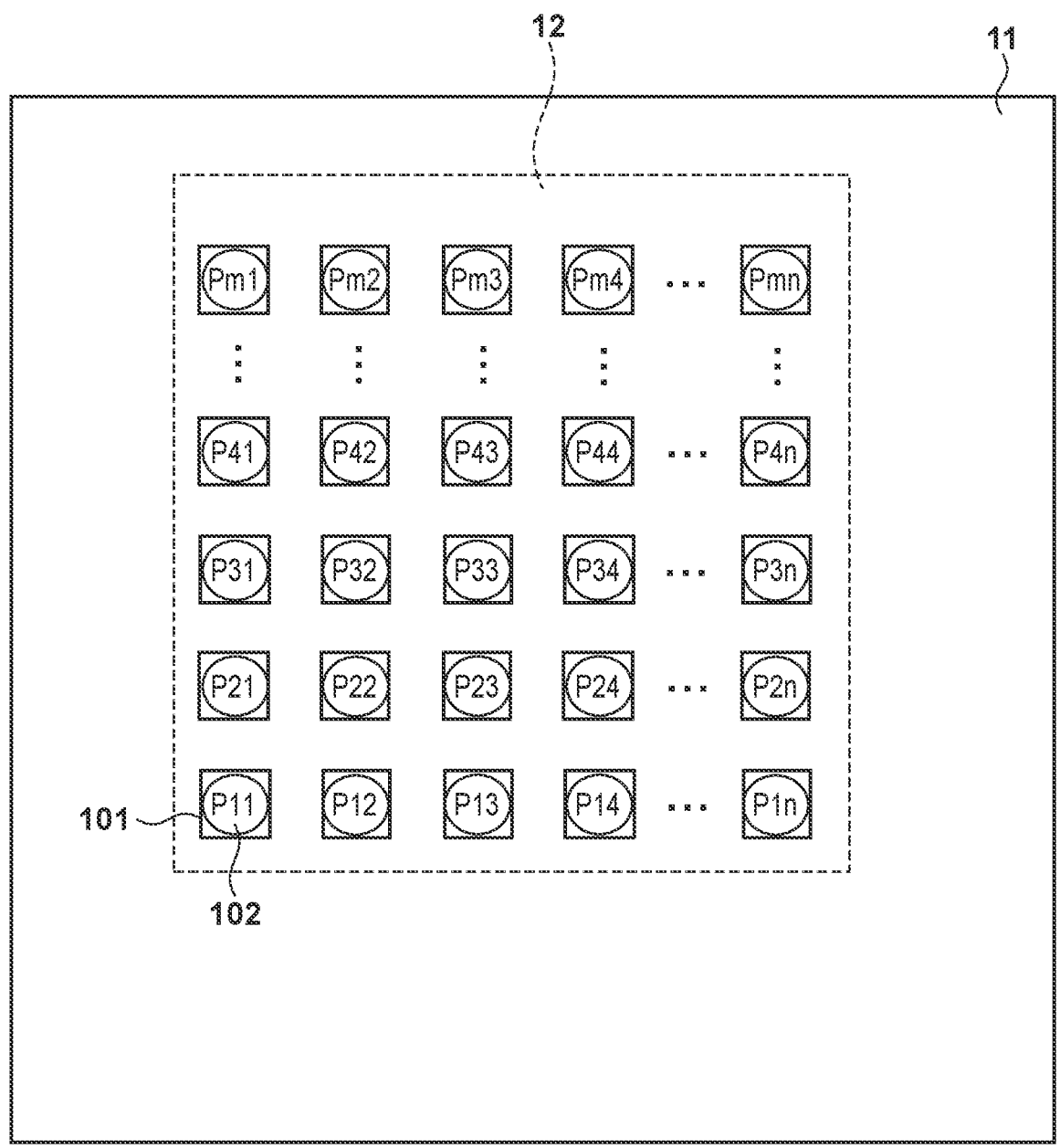
FIG. 2 is a view showing an example of the arrangement of a sensor chip.

FIG. 2 is a view showing an example of the arrangement of the sensor chip 11. The pixel region 12 of the sensor chip 11 includes a plurality of pixels 101 as detection pixels arranged over a plurality of rows and a plurality of columns on a two-dimensional surface. Each pixel 101 includes a photoelectric conversion unit or circuit 102 with an avalanche photodiode (APD). In FIG. 2, m×n pixels 101 arranged in m rows from the first row to the mth row and n columns from the first column to the nth column are represented using numbers indicating the row number and the column number. For example, the unit pixel 101 arranged in the first row and the third column (that is, m=1 and n=3) is represented by "P13". Note that the numbers of rows and columns of the pixel array forming the pixel region 12 are not particularly limited.

Figure 3:
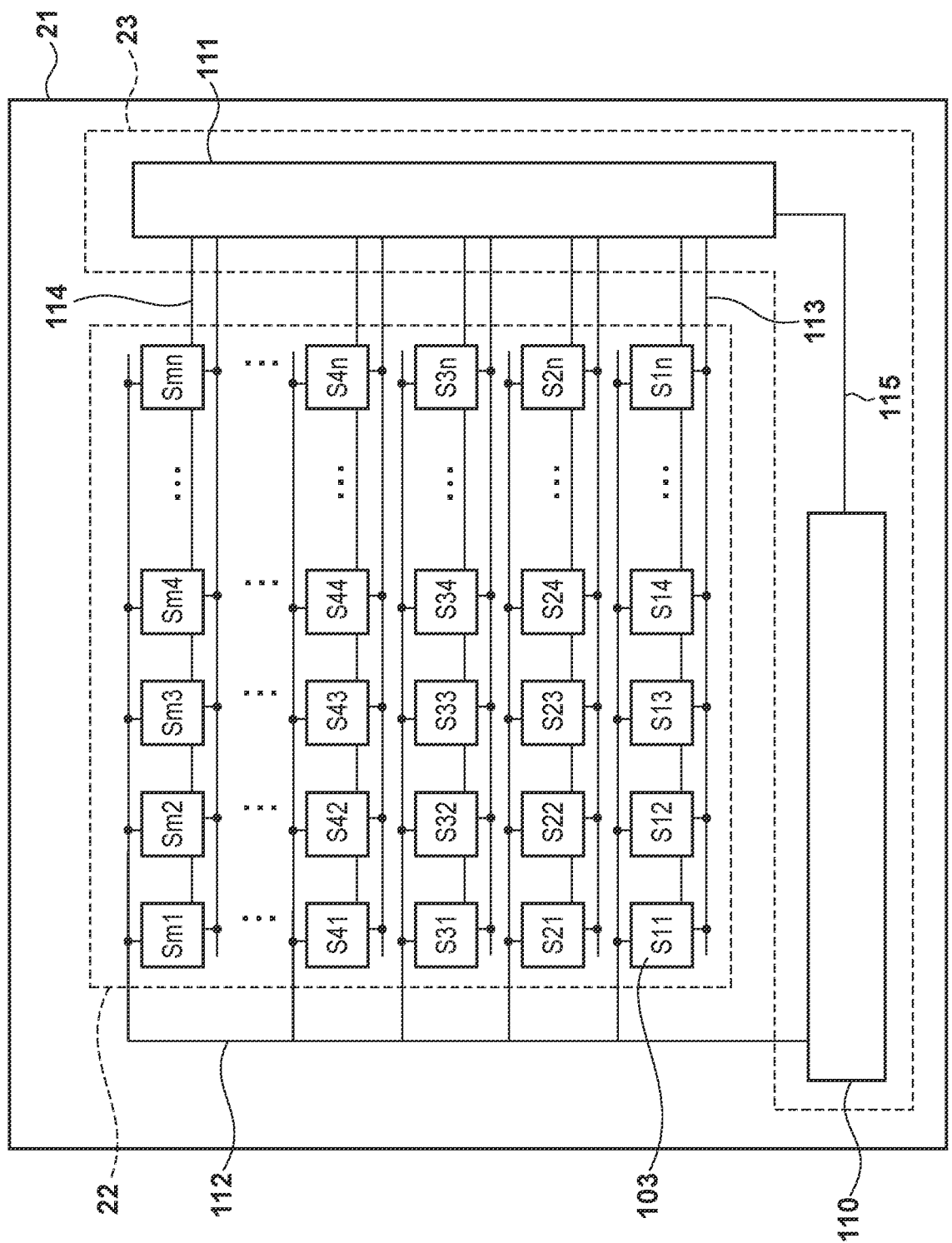
FIG. 3 is a view showing an example of the arrangement of a circuit chip.

FIG. 3 is a view showing an example of the arrangement of the circuit chip 21. The circuit chip 21 includes the pixel circuit region 22 and the readout circuit region 23.

The pixel circuit region 22 includes a plurality of signal processing units or circuits 103 arranged over a plurality of rows and a plurality of columns on a two-dimensional surface. In FIG. 3, some of m×n signal processing units 103 arranged from the first row to the mth row and from the first column to the nth column are represented using numbers indicating the row number and the column number. For example, the signal processing unit or circuit 103 arranged in the first row and the third column (that is, m=1 and n=3) is represented by "S13". Note that the numbers of rows and columns of the signal processing unit array forming the pixel circuit region 22 are not particularly limited.

The readout circuit region 23 includes a control pulse generation unit or circuit 110 and a signal readout circuit 111. In each row of the signal processing unit array of the pixel circuit region 22, a control line 112 and a data signal line 113 are arranged to extend in the first direction (the horizontal direction in FIG. 3). The control line 112 and the data signal line 113 are connected to the plurality of signal processing units 103 arranged in the first direction. The first direction in which the control line 112 extends will sometimes be referred to as the row direction or the horizontal direction hereinafter. Furthermore, in each row of the signal processing unit array of the pixel circuit region 22, a readout request signal line 114 is connected in the form in which the plurality of signal processing units 103 arranged in the first direction are connected.

The control line 112 of each row is connected to the control pulse generation unit 110. The control pulse generation unit 110 serving as a control pulse providing unit provides a control signal for driving the signal processing unit 103 to the signal processing unit 103 via the control line 112. The control pulse generation unit 110 and the signal readout circuit 111 are connected via a control line 115. The control pulse generation unit 110 provides a control signal for driving the signal readout circuit 111 via the control line 115 in synchronism with the signal processing unit 103. The control pulse generation unit 110 may generate a control signal based on an external trigger (not shown) or an internal signal.

The data signal line 113 and the readout request signal line 114 of each row are connected to the signal readout circuit 111. The data signal line 113 is a signal line for transmitting a plurality of data generated by the signal processing unit 103 serving as a data generation unit. The plurality of data include a pixel counter value, a readout cycle counter value, and position coordinate information and details thereof will be described later. The readout request signal line 114 is a signal line for transmitting a readout request transmitted by each signal processing unit 103. In response to the readout request of the readout request signal line 114, the signal readout circuit 111 acquires the plurality of data from the data signal line 113.

Figure 4:
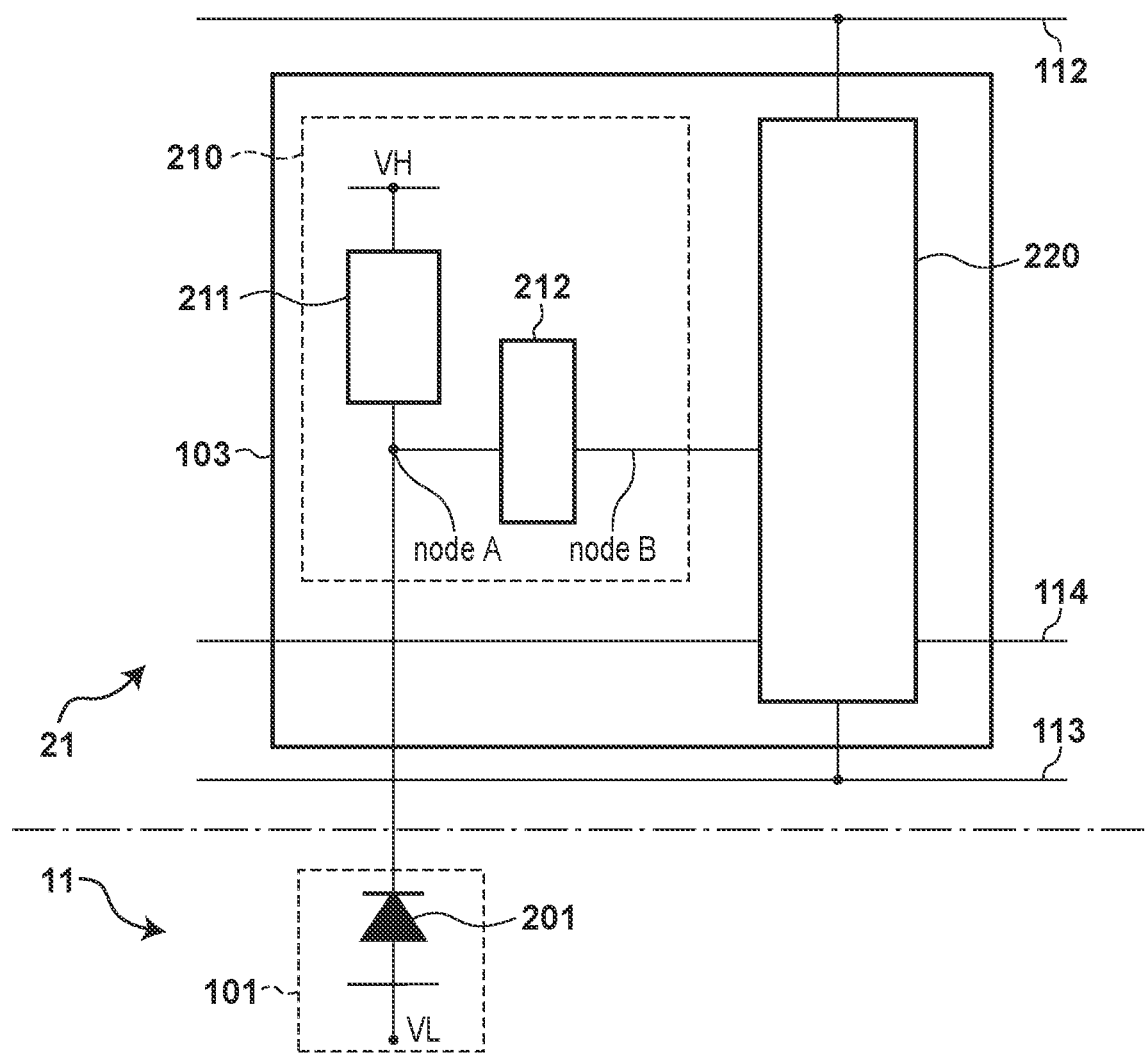
FIG. 4 is a circuit diagram showing equivalent circuits of a pixel and a signal processing circuit.

FIG. 4 is a circuit diagram showing equivalent circuits of the pixel 101 shown in FIG. 2 and the signal processing unit 103 shown in FIG. 3. The combination of the pixel 101 and its corresponding signal processing unit 103 form a detection element. The pixel 101 in the sensor chip 11 includes an APD 201 serving as a photoelectric conversion unit or circuit. When light enters the APD 201, charge pairs corresponding to the incident light are generated by photoelectric conversion. The anode of the APD 201 is provided with a voltage VL (first voltage). The cathode of the APD 201 is provided with a voltage VH (second voltage) higher than the voltage VL provided to the anode. The anode and the cathode are provided with a reverse bias voltage that causes the APD 201 to perform an avalanche multiplication operation. By setting the state in which such voltage is provided, charges generated by the incident light cause avalanche multiplication, thereby generating an avalanche current.

Note that when a reverse bias voltage is provided, there are two modes of a Geiger mode and a linear mode. The Geiger mode is a mode operated in a state in which the potential difference between the anode and the cathode is larger than the breakdown voltage. The linear mode is a mode operated in a state in which the potential difference between the anode and the cathode is around or smaller than the breakdown voltage. An APD operated in the Geiger mode is called a Single-Photon Avalanche Diode (SPAD). For example, the voltage VL (first voltage) is "−30 V" and the voltage VH (second voltage) is "1 V".

The signal processing unit 103 in the circuit chip 21 is formed by a pulse generation unit or circuit 210 and a pulse processing unit or circuit 220. The pulse generation unit 210 includes a quenching element or circuit 211 and a waveform shaping unit or circuit 212. The quenching element 211 is connected to the APD 201 and a power supply for providing the voltage VH. The quenching element 211 has a function of replacing, by a voltage signal, a change of the avalanche current generated in the APD 201. The quenching element 211 functions as a load circuit (quenching circuit) at the time of signal multiplication by avalanche multiplication, and serves to suppress avalanche multiplication by suppressing the voltage provided to the APD 201 (quenching operation).

The waveform shaping unit 212 outputs a pulse signal by shaping the potential change of the cathode of the APD 201 obtained at the time of detection of a photon. For the waveform shaping unit 212, for example, an inverter circuit or a buffer circuit is used. Upon receiving a photon detection pulse generated by the pulse generation unit 210, the pulse processing unit 220 transfers the plurality of data via the data signal line 113.

Figure 5:
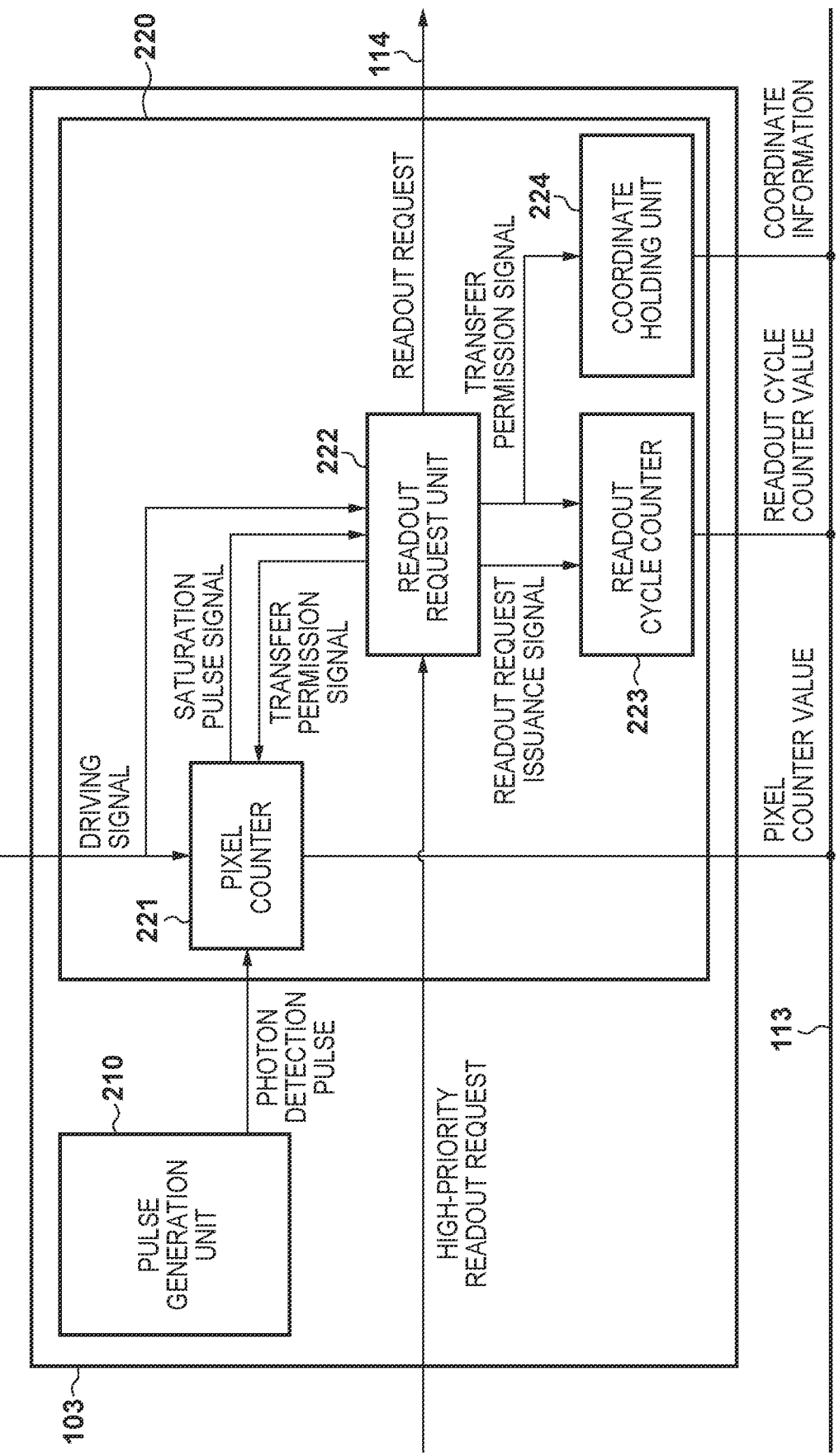
FIG. 5 is a block diagram showing an example of the arrangement of a pulse processing circuit 220 according to the first embodiment.

FIG. 5 is a block diagram showing an example of the arrangement of the pulse processing unit 220 according to the first embodiment. The pulse processing unit 220 includes a pixel counter 221, a readout request unit or circuit 222, a readout cycle counter 223, and a coordinate holding unit or circuit 224.

The pixel counter 221 is a counter that counts the number of pulse signals (that is, the number of detected photons) output from the pulse generation unit 210. Based on a driving signal received via the control line 112, the pixel counter 221 starts or stops counting. The pixel counter 221 is, for example, an 8-bit counter, and outputs a saturation pulse signal when a saturation value (all bits are "1") is reached. Note that the pulse signal output from the pixel counter 221 may be issued when the counter value exceeds a predetermined threshold. If the counter value does not reach the saturation value during a predetermined period, the pixel counter 221 receives a transfer permission signal from the readout request unit 222, and transfers the pixel counter value to the signal readout circuit 111 via the data signal line 113.

Based on the saturation pulse signal output from the pixel counter 221 or the driving signal received via the control line 112, the readout request unit 222 transmits a readout request to the signal readout circuit 111 via the readout request signal line 114. More specifically, the readout request signal line 114 is set at high level, thereby transmitting the readout request. If the saturation pulse signal is received, the readout request unit 222 issues a readout request issuance signal to the readout cycle counter 223.

The readout request unit 222 controls the readout request in accordance with the presence/absence of a "high-priority readout request" from another signal processing unit or circuit having a high priority level. The priority level is determined in advance for each of the plurality of signal processing units 103, and held in the readout request unit 222. In FIG. 3, for example, the signal processing unit 103 (that is, S11) at the left end has the highest priority level, and the priority level is lower as the column number advances in the horizontal direction (that is, S11→S12→S13). This simplifies the wiring of the readout request signal line 114. The method of assigning the priority levels is not limited to this, as a matter of course. The signal processing unit having the highest priority level performs the same operation as that in the example of the arrangement shown in FIG. 5 on the assumption that the readout request of the signal processing unit having a high priority level always stops (the readout request signal line 114 is at low level).

Subsequently, the method of controlling the readout request of the readout request unit 222 will be described. If no readout request is generated in the signal processing unit to which the readout request unit 222 belongs, the readout request unit 222 transfers intact a high-priority readout request from another signal processing unit having a high priority level. On the other hand, if a readout request is generated in the signal processing unit to which the readout request unit 222 belongs and another signal processing unit having a high priority level generates a readout request (high), the readout request unit 222 transmits the readout request to the signal readout circuit 111. In addition, the readout request of the signal processing unit to which the readout request unit 222 belongs is extended by one cycle. If a readout request issuance signal is issued to the readout cycle counter 223, the readout request is similarly extended. That is, the counter value of the readout cycle counter 223 is the number of delay cycles.

If the readout request from another signal processing unit 103 having a high priority level is stopped (low), it is determined that the readout request of the signal processing unit to which the readout request unit 222 belongs is permitted, and the readout request unit 222 stops (low) the readout request signal, and issues a transfer permission signal. If the readout request unit 222 receives a saturation pulse signal and issues a readout request, it issues a transfer permission signal to the readout cycle counter 223 and the coordinate holding unit 224. On the other hand, if the readout request unit 222 receives a driving stop signal and issues a readout request, it issues a transfer permission signal to the pixel counter 221 and the coordinate holding unit 224.

The readout cycle counter 223 is, for example, a counter (for example, a 8-bit counter) that counts the number of cycles from when a readout request is issued until readout is permitted. The readout cycle counter 223 starts counting upon receiving the readout request issuance signal from the readout request unit 222, stops counting upon receiving the transfer permission signal, and also transmits a readout cycle counter value to the signal readout circuit 111 via the data signal line 113.

The coordinate holding unit 224 holds information indicating a pixel position. Upon receiving the transfer permission signal from the readout request unit 222, the coordinate holding unit 224 transmits the position coordinate information to the signal readout circuit 111 via the data signal line 113.

Figure 6:
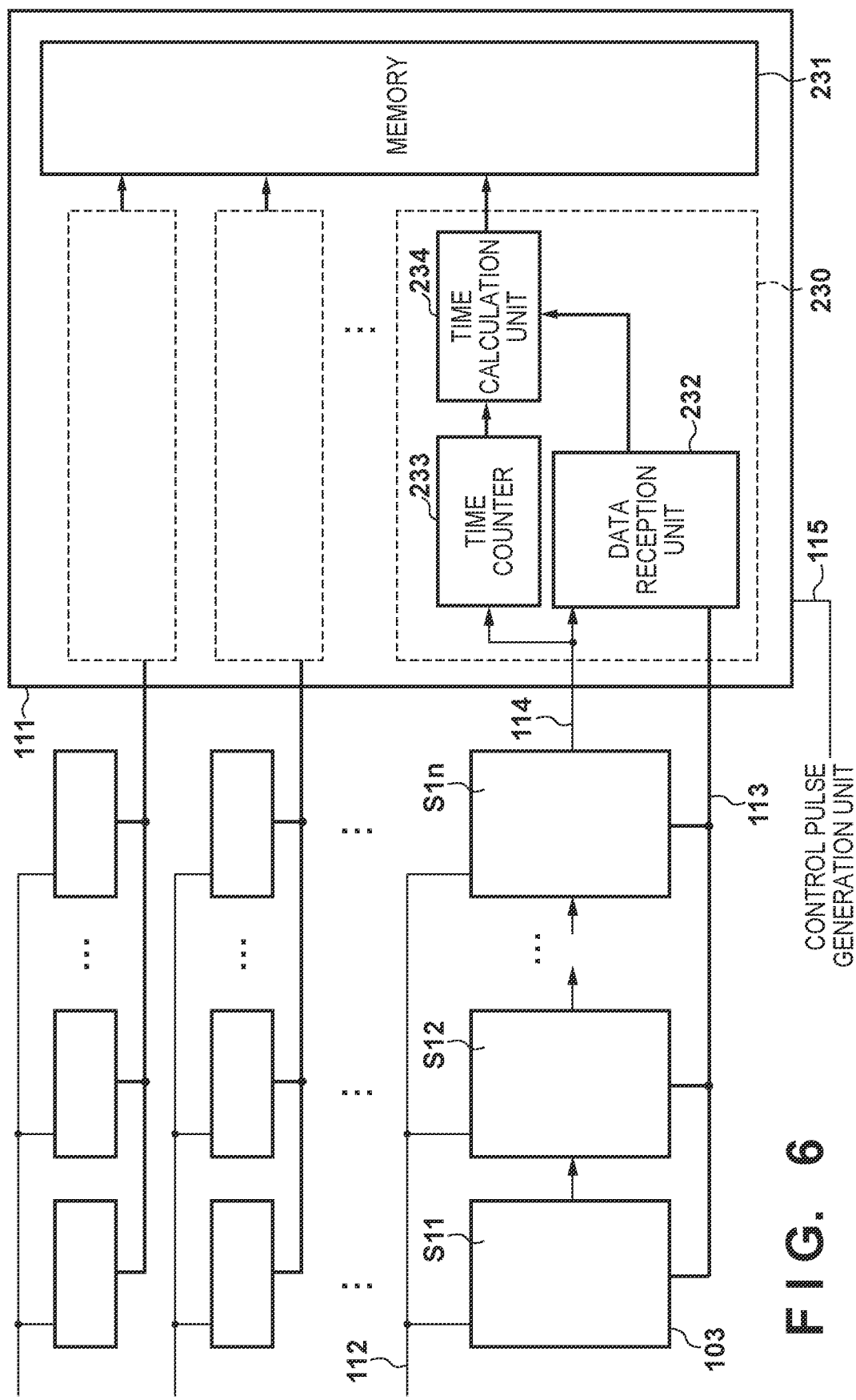
FIG. 6 is a block diagram showing the arrangement of a signal readout circuit and its connection to signal processing circuits.

FIG. 6 is a block diagram showing the arrangement of the signal readout circuit 111 and its connection to the signal processing units 103.

The signal readout circuit 111 includes a row readout circuit 230 connected for each row, and a memory 231 that stores readout signal values. The row readout circuit 230 includes a data reception unit or circuit 232, a time counter 233, and a time calculation unit or circuit 234. Upon receiving the readout request from the signal processing unit 103 via the readout request signal line 114, the data reception unit 232 acquires the position coordinate information of the data signal line 113 and the pixel counter value or the cycle counter value.

Upon receiving the control signal from the control pulse generation unit 110 via the control line 115, the time counter 233 measures the exposure time. The time counter 233 transmits, to the time calculation unit 234, the counter value obtained at the timing of receiving the readout request. The time calculation unit 234 calculates, as a time value when the readout request pulse of the signal processing unit 103 is generated, a value by subtracting the readout cycle counter value of the data reception unit 232 from the time counter value of the time counter 233. Furthermore, the time calculation unit 234 receives the position coordinate information from the data reception unit 232, and records the calculated time value at an address on the memory 231 based on the position coordinate information.

As the number of readout requests generated simultaneously from the pixel counters 221 is larger, the waiting time of the readout request is longer. That is, the value to be counted by the readout cycle counter is caused by the number of simultaneously generated readout requests. Therefore, as the number of counter bits of the readout cycle counter 223, the number of bits with which a value obtained by multiplying "the number (M (M is an integer of 2 or more)) of connected signal processing units 103" by "the number of readout cycles" can be counted is selected. If, for example, 256 pixels (M=256) are connected and readout can be performed in one cycle, an 8-bit counter is used, and if 256 pixels are connected and readout is performed in three cycles, an 11-bit counter is used. Thus, in any case, the timing at which the readout request is generated can be calculated in an accurate time. The number of counter bits of the readout cycle counter 223 may be determined in accordance with the priority level. The readout request of the signal processing unit having the highest priority level is always permitted, the signal processing unit need not include the readout cycle counter 223. However, in general, in terms of the easiness of design, the signal processing units preferably have the same arrangement even if the arrangement is redundant to some extent. The number of counter bits of the readout cycle counter 223 is not limited to them, as a matter of course.

<Operation of Apparatus>

Figure 7:
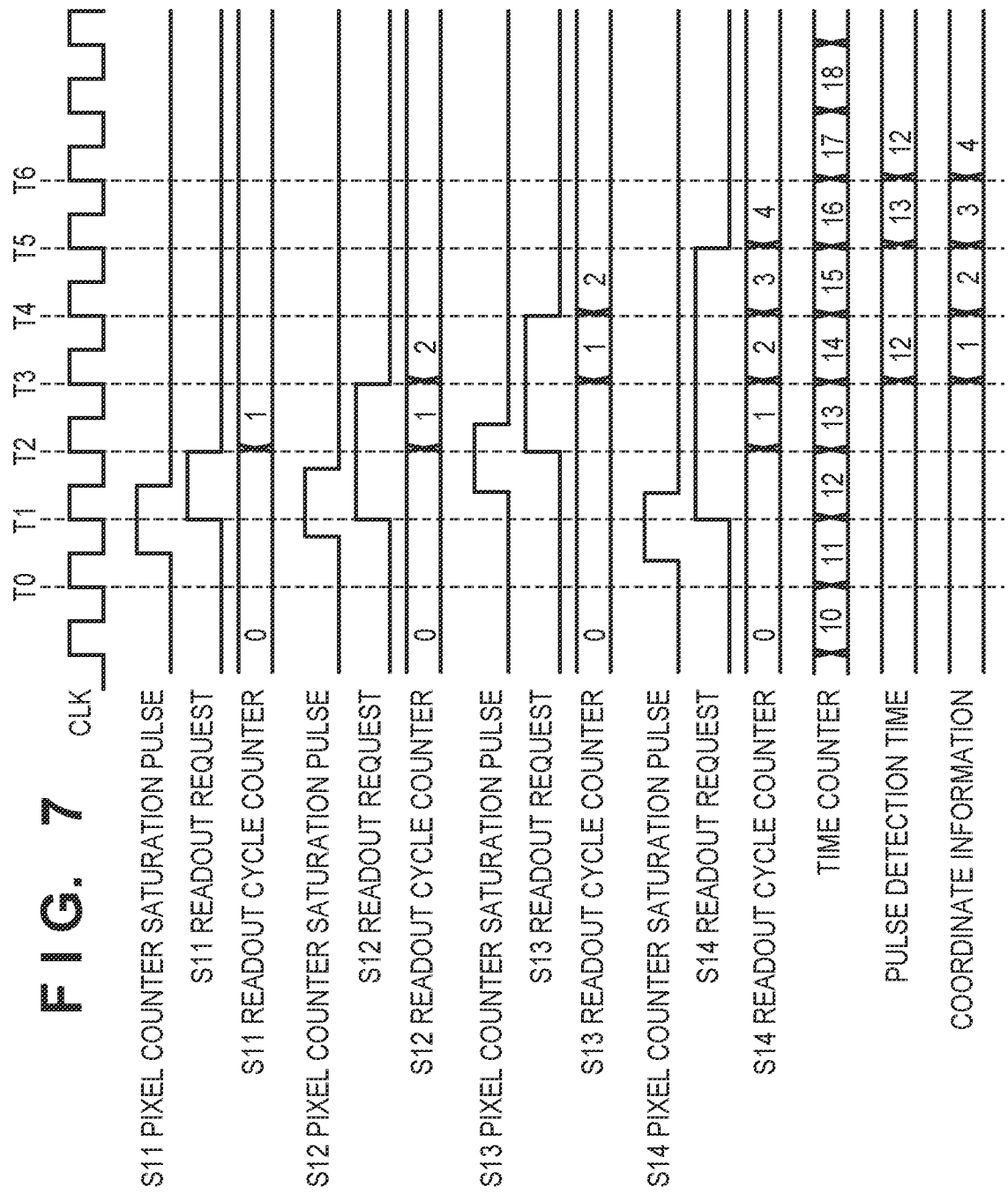
FIG. 7 is a timing chart showing the operations of the signal processing circuits and a row readout circuit.

FIG. 7 is a timing chart showing control of the readout requests in the four (that is, M=4) signal processing units 103 and the operation of the row readout circuit 230. In this example, four (the signal processing units S11 to S14) of the n signal processing units in the first row will be exemplified, and no readout requests are generated from the remaining signal processing units 103. Note that the exemplified timing chart is an example satisfying this embodiment, and this embodiment is not limited to the transition timings of signals.

T0 to T6 represent times at the rising edges of CLK. In this example, during a period from time T0 to time T6, the pixel counters of the signal processing units S11 to S14 exceed the threshold to establish readout requests. Note that among the signal processing units S11 to S14, the number in the horizontal direction is smaller, the signal processing unit has a higher priority level for readout.

Each signal shown in FIG. 7 will be described first. A pixel counter saturation pulse is a signal issued by the pixel counter 221 upon receiving a pulse from the pulse generation unit 210. A readout request is a signal issued by the readout request unit 222 in synchronism with CLK upon receiving the pixel counter saturation pulse. A readout cycle counter is the counter value of the readout cycle counter 223. A time counter is the counter value of the time counter 233. A pulse detection time is an output signal of the calculation result of the time calculation unit 234. Position coordinate information is position coordinate information received by the row readout circuit 230 from the signal processing unit.

Each of the signal processing units S11, S12, and S14 issues a pixel counter saturation pulse at an arbitrary timing during a period from time T0 to time T1. The signal processing unit S13 issues a pixel counter saturation pulse at an arbitrary timing during a period from time T1 to time T2.

Upon receiving the pixel counter saturation pulse, the signal processing unit S11 issues a readout request at time T1. As described above, since the signal processing unit S11 is a signal processing unit having the highest priority level, it stops the readout request at time T2. Furthermore, at time T2, the signal processing unit S11 transfers "1" as the readout cycle counter value, and transfers "1" as the position coordinate information.

Upon receiving the pixel counter saturation pulse, the signal processing unit S12 issues a readout request at time T1. At time T2, the signal processing unit S12 receives, as an arbitration signal, the readout request signal issued by the signal processing unit S11, and extends the readout request. Furthermore, the readout cycle counter is counted up. At time T3, when the readout request of the signal processing unit S11 is stopped, the signal processing unit S12 transfers "2" as the readout cycle counter value, and transfers "2" as the position coordinate information.

Similarly, the signal processing unit S13 issues a readout request at time T2. At time T3, the signal processing unit S13 extends the readout request, and counts up the readout cycle counter. At time T4, the signal processing unit S13 transfers "2" as the readout cycle counter value, and transfers "3" as the position coordinate information.

Similarly, the signal processing unit S14 issues a readout request at time T1. During a period from time T2 to time T4, the signal processing unit S14 extends the readout request, and counts up the readout cycle counter. At time T5, the signal processing unit S14 transfers "4" as the readout cycle counter value, and transfers "4" as the position coordinate information.

The row readout circuit 230 calculates a pulse detection time as a time when the signal processing unit S11 detects the pixel counter saturation pulse, by subtracting, from the time counter, the readout cycle counter received from the signal processing unit S11 at time T3. The row readout circuit 230 records the calculated pulse detection time at a corresponding memory address based on the simultaneously received position coordinate information. Similarly, during a period from time T4 to time T6, the row readout circuit 230 records the calculated pulse detection time at a memory address based on the position coordinate information.

In this example, the pulse detection time of each of the signal processing units S11 to S14 is as follows. This can calculate the accurate time regardless of the time (the number of delay cycles) delayed by extending the readout request.

S11: 13−1=12
S12: 14−2=12
S13: 15−2=13
S14: 16−4=12

As described above, according to the first embodiment, a readout request generation timing is calculated using the readout cycle counter. Thus, even if readout requests collide with each other in a plurality of pixels that share the time counter and the data signal line, it is possible to calculate the accurate readout request generation timing. In particular, when a plurality of pixels share a time counter large in circuit scale, it is possible to reduce the circuit scale of the pixel circuit region 22.

As a result, the circuit region in one pixel can be decreased, thereby implementing a high-resolution pixel array. Furthermore, by sharing a time counter that is driven all the time, it is possible to largely reduce power. Note that a readout cycle counter is added to each signal processing unit but the driving time is limited, thereby making it possible to suppress the influence on power.

Second Embodiment

The second embodiment will describe a form effective for a sensor that includes no pixel counter such as a ToF counter. The first embodiment has explained the arrangement in which even if all pixels sharing a time counter issue readout requests simultaneously, it is possible to calculate the accurate times at which the readout requests are issued and sequentially perform readout. However, if a predetermined number or more of readout requests collide with each other, readout may be aborted. Thus, the collision of a relatively small number of readout requests, whose occurrence frequency is high, can decrease the number of bits of the readout cycle counter and reduce the circuit scale while making it possible to calculate the accurate times.

<Apparatus Arrangement>

Figure 8:
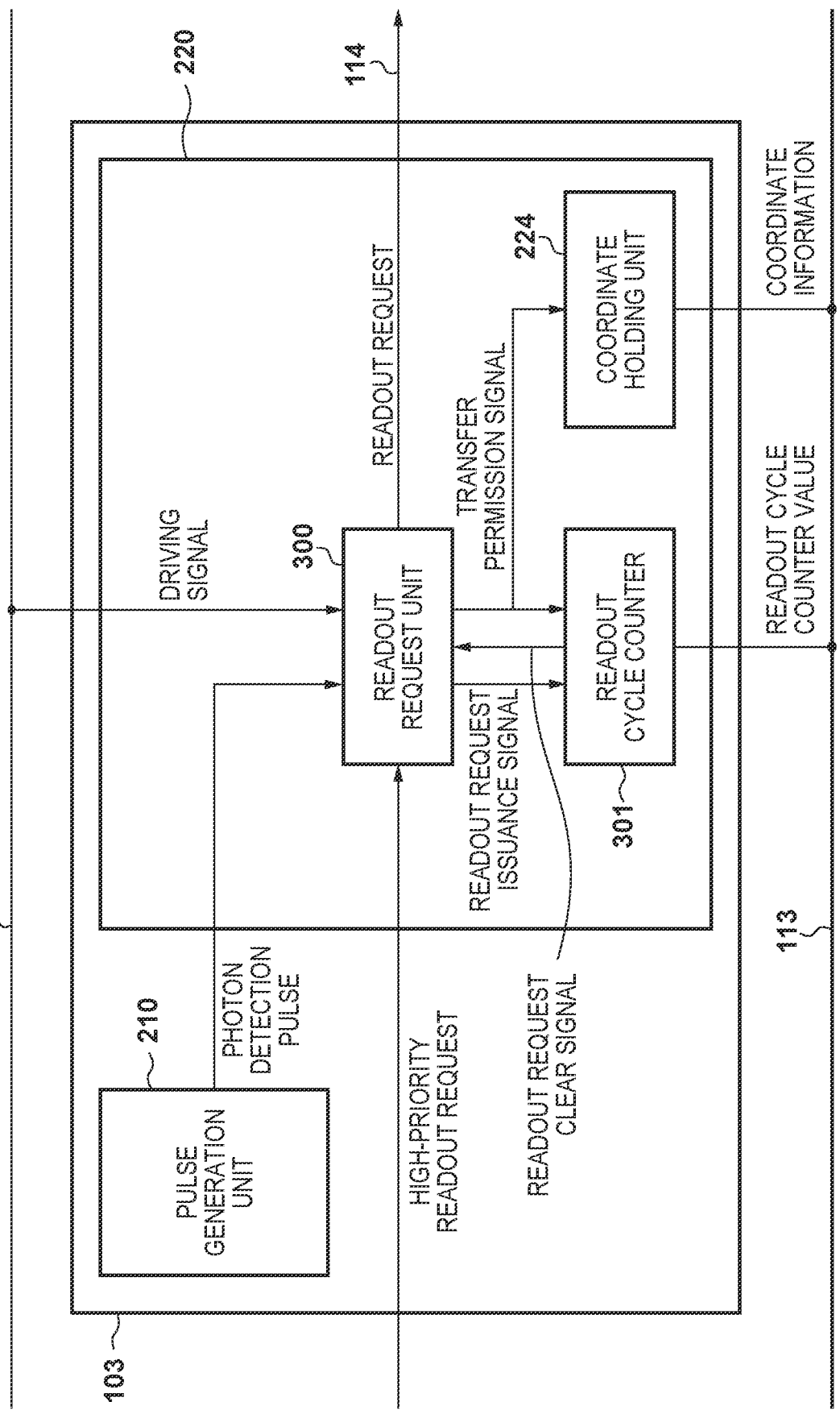
FIG. 8 is a block diagram showing an example of the arrangement of a pulse processing circuit 220 according to the second embodiment.

FIG. 8 is a block diagram showing an example of the arrangement of a pulse processing unit or circuit 220 according to the second embodiment. Note that the remaining arrangement is the same as in the first embodiment (FIGS. 1 to 4), and a description thereof will be omitted.

The pulse processing unit 220 includes a readout request unit or circuit 300, a readout cycle counter 301, and a coordinate holding unit or circuit 224. The coordinate holding unit 224 performs the same operation as in the first embodiment, and is thus denoted by the same reference numeral, and a description thereof will be omitted.

Upon receiving a photon detection pulse output from a pulse generation unit 210, the readout request unit 300 transmits a readout request to a signal readout circuit 111 via a readout request signal line 114. The readout request unit 300 issues a readout request issuance signal to the readout cycle counter 301. The readout request unit 300 controls the readout request in accordance with the presence/absence of a "high-priority readout request" from another signal processing unit having a high priority level. The priority level is determined in advance for each of a plurality of signal processing units 103, and held in the readout request unit 300. The pulse processing unit of the signal processing unit having the highest priority level performs the same operation as that in the example of the arrangement shown in FIG. 8 on the assumption that the high-priority readout request always stops (low).

Subsequently, the method of controlling the readout request of the readout request unit 300 will be described. If no readout request is generated in the signal processing unit to which the readout request unit 300 belongs, the readout request unit 300 transfers intact a high-priority readout request from another signal processing unit having a high priority level. If a readout request is generated in the signal processing unit to which the readout request unit 300 belongs and another signal processing unit having a high priority level simultaneously generates a readout request (high), the readout request unit 300 transmits the readout request to the signal readout circuit 111, and also extends, by one cycle, the readout request of the signal processing unit to which the readout request unit 300 belongs. If the readout request issuance signal is issued to the readout cycle counter 301, the readout request is similarly extended.

If the readout request from another signal processing unit 103 having a high priority level is stopped (low), it is determined that the readout request of the signal processing unit to which the readout request unit 300 belongs is permitted, and the readout request unit 300 stops (low) the readout request. Furthermore, the readout request unit 300 issues (high) a transfer permission signal to the readout cycle counter 301 and the coordinate holding unit 224. If the readout request unit 300 receives a readout request clear signal from the readout cycle counter 301, it determines that the readout request of the pixel corresponding to the signal processing unit to which the readout request unit 300 belongs is not permitted within a predetermined time, stops (low) the readout request, and waits for reception of a new photon detection pulse.

The readout cycle counter 301 is a counter (for example, a 3-bit counter) that counts the number of cycles from when a readout request is issued until readout is permitted. The readout cycle counter 301 starts counting upon receiving the readout request issuance signal from the readout request unit 300, stops counting upon receiving the transfer permission signal, and also transmits a readout cycle counter value to the signal readout circuit 111 via a data signal line 113. On the other hand, if a carry is generated from the most significant bit of the readout cycle counter before receiving the transfer permission signal (that is, the count value is saturated), the readout cycle counter 301 issues a request clear signal to the readout request unit 300.

As the number of readout requests generated simultaneously from the pulse generation units 210 is larger, the waiting time of the readout request is longer. On the other hand, since the readout cycle counter 301 can clear the readout request, it can prepare for receiving a next photon while canceling readout when photons are simultaneously detected in a predetermined number or more of pixels at a low probability. For example, if 256 pixels are connected and readout can be performed in one cycle, when a 3-bit counter is provided, it is possible to reduce the circuit scale while permitting simultaneous detection of photons up to eight pixels. Alternatively, if 256 pixels are connected and readout is performed in three cycles, when a 5-bit counter is provided, photons can be detected simultaneously up to eight pixels. Note that the number of counter bits of the readout cycle counter 301 is not limited to them.

As described above, according to the second embodiment, the collision of a relatively small number of readout requests, whose occurrence frequency is high, can decrease the number of bits of the readout cycle counter and reduce the circuit scale while making it possible to calculate the accurate times.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-135027, filed Aug. 20, 2021, which is hereby incorporated by reference herein in its entirety.

What is claimed is:

1. An image capturing apparatus comprising:
   M (M is an integer not less than 2) detection elements each including a detection pixel configured to detect incidence of a photon and a generation circuit configured to generate a readout request and data based on the detection of the photon in the detection pixel;
   a readout circuit configured to receive the readout request and the data from each of the M detection elements; and
   a control pulse providing circuit configured to provide a control pulse to the M detection elements and the readout circuit,
   wherein the generation circuit of each of the M detection elements includes
   a cycle counter configured to count the number of delay cycles from when the readout request is issued until the readout request is permitted,
   a coordinate holding circuit configured to hold position coordinate information of the detection element corresponding to the generation circuit, and
   a data generation circuit configured to generate the data including the number of delay cycles and the position coordinate information,
   the readout circuit includes a time counter configured to count a time based on the control pulse, and
   the readout circuit determines the generation circuit corresponding to the readout request and a generation timing at which the readout request is generated, based on a counter value of the time counter and the number of delay cycles included in the data corresponding to the received readout request.

2. The apparatus according to claim 1, wherein
   the generation circuit of each of the M detection elements further includes a pixel counter configured to count the number of detected photons in the detection pixel, and
   the data generation circuit generates the data including the number of detected photons, the number of delay cycles, and the position coordinate information.

3. The apparatus according to claim 1, wherein the readout circuit further includes
   a first reception circuit configured to receive the readout request from each of the M detection elements via a first signal line shared by the M detection elements, and
   a second reception circuit configured to receive the data from each of the M detection elements via a second signal line shared by the M detection elements.

4. The apparatus according to claim 3, wherein the readout circuit determines the generation circuit corresponding to the readout request based on the position coordinate information included in the data.

5. The apparatus according to claim 3, wherein the readout circuit determines, as the generation timing, a time obtained by subtracting a time indicated by the number of delay cycles included in the data from the time indicated by the time counter.

6. The apparatus according to claim 2, wherein the generation circuit generates the readout request when a count value of the pixel counter exceeds a threshold.

7. The apparatus according to claim 6, wherein the threshold is a saturation value of the pixel counter.

8. The apparatus according to claim 1, wherein
the cycle counter issues a readout request clear signal when a count value of the cycle counter is saturated before the readout request is permitted, and
when the readout request clear signal is issued, the generation circuit stops the readout request in the generation circuit, and waits for detection of a new photon in the detection pixel.

9. The apparatus according to claim 1, wherein the cycle counter is a counter capable of counting a value by multiplying M by the number of readout cycles.

10. The apparatus according to claim 1, wherein
the M detection elements are arranged on a two-dimensional surface, and
the position coordinate information is based on position coordinates of the corresponding detection element on the two-dimensional surface.

11. The apparatus according to claim 1, wherein the detection pixel comprises an avalanche photodiode (APD).

12. A control method for an image capturing apparatus, the image capturing apparatus including
M (M is an integer not less than 2) detection elements each including a detection pixel configured to detect incidence of a photon and a generation circuit configured to generate a readout request and data based on the detection of the photon in the detection pixel,
a readout circuit configured to receive the readout request and the data from each of the M detection elements, and
a control pulse providing circuit configured to provide a control pulse to the M detection elements and the readout circuit,
the generation circuit of each of the M detection elements including
a cycle counter configured to count the number of delay cycles from when the readout request is issued until the readout request is permitted,
a coordinate holding circuit configured to hold position coordinate information of the detection pixel corresponding to the generation circuit, and
a data generation circuit configured to generate the data including the number of delay cycles and the position coordinate information, and
the readout circuit including a time counter configured to count a time based on the control pulse,
the method comprising:
determining, by the readout circuit, the generation circuit corresponding to the readout request and a generation timing at which the readout request is generated, based on a counter value of the time counter and the number of delay cycles included in the data corresponding to the received readout request.

13. An image capturing apparatus including an image sensor in which a plurality of detection pixels each configured to detect a photon are arranged, comprising:
a time counter configured to count an elapsed time after a start of exposure of the image sensor;
a pixel circuit arranged for each of the plurality of detection pixels and including a pixel counter configured to count the number of photons detected by the detection pixel and a delay counter configured to count, if the pixel counter is saturated, an elapsed time after the pixel counter is saturated; and
a readout circuit configured to determine, based on a count result of the delay counter and a count result of the time counter, a pixel value of the detection pixel in which the pixel counter is saturated, and determine, based on a count result of the pixel counter, a pixel value of the detection pixel in which the pixel counter is not saturated.

* * * * *